(12) United States Patent
Agostinelli et al.

(10) Patent No.: US 9,762,067 B2
(45) Date of Patent: Sep. 12, 2017

(54) ACTIVE RECTIFIER FOR EFFICIENT WIRELESS POWER TRANSFER

(71) Applicant: Infineon Technologies Austria AG, Villach (AT)

(72) Inventors: Matteo Agostinelli, Villach (AT); Jesus Angel Oliver, Madrid (ES); Sanna Vesti, Madrid (ES); Jose Antonio Cobos, Madrid (ES)

(73) Assignee: Infineon Technologies Austria AG, Villach (AT)

( * ) Notice: Subject to any disclaimer, the term of this patent is extended or adjusted under 35 U.S.C. 154(b) by 652 days.

(21) Appl. No.: 14/292,369

(22) Filed: May 30, 2014

(65) Prior Publication Data

US 2015/0349538 A1 Dec. 3, 2015

(51) Int. Cl.

| | |
|---|---|
| *H02J 5/00* | (2016.01) |
| *H04B 5/00* | (2006.01) |
| *H02J 7/02* | (2016.01) |
| *H02J 50/12* | (2016.01) |
| *H02M 7/219* | (2006.01) |

(52) U.S. Cl.
CPC .............. *H02J 5/005* (2013.01); *H02J 7/025* (2013.01); *H02J 50/12* (2016.02); *H02M 7/219* (2013.01); *H04B 5/0037* (2013.01); *H04B 5/0081* (2013.01); *Y02B 70/1408* (2013.01)

(58) Field of Classification Search
CPC ............ H02J 5/005; H02J 50/12; H02J 7/025; H02M 7/219; H04B 5/0037; H04B 5/0081
USPC ........................................................ 307/104
See application file for complete search history.

(56) References Cited

U.S. PATENT DOCUMENTS

2014/0028110 A1* 1/2014 Petersen ................. H02J 5/005
                                                    307/104
2015/0215006 A1* 7/2015 Mehas .................... H02J 7/025
                                                    307/104

OTHER PUBLICATIONS

Zhao, C. et al., "Active Resonance Wireless Power Transfer System Using Phase Shift Control Strategy," IEEE, Applied Power Electronics Conference and Exposition (APEC), Mar. 16-20, 2014, pp. 1336-1341.

\* cited by examiner

*Primary Examiner* — Rexford Barnie
*Assistant Examiner* — Toan Vu
(74) *Attorney, Agent, or Firm* — Shumaker & Sieffert, P.A.

(57) ABSTRACT

Methods, devices, and integrated circuits are disclosed for efficiently receiving a wireless power transfer. In one example, a device configured for receiving a wireless power transfer includes an active rectifier, rectifier input nodes, and a controller. The controller is operatively coupled to the active rectifier and configured to control the active rectifier to modify the impedance at the rectifier input nodes.

18 Claims, 6 Drawing Sheets

ACTIVE RECTIFIER FOR EFFICIENT WIRELESS POWER TRANSFER

TECHNICAL FIELD

The invention relates to power conversion, and in particular, to wireless power transfer.

BACKGROUND

The rapid rise of mobile devices has fueled interest in wireless power transfer, in which wireless power transfer base stations are enabled to wirelessly charge mobile devices. In a typical wireless power transfer system, a base station may have a power supply that includes a magnetic inductive coil acting as a wireless power transmitter, and a mobile device may be configured with a wireless power receiver that includes another magnetic inductive coil. The inductive coil in the receiver may be inductively charged by the inductive coil in the wireless power transmitter. The wireless power receiver may be configured to use the charge transfer to charge an internal battery. In this way, the mobile device may charge itself wirelessly from the base station without the need for any hard-wire connection to a power source.

SUMMARY

In general, various examples of this disclosure are directed to efficient wireless power transfer. Existing wireless power transfer systems are limited in the efficiency of their power transfer. In various examples of this disclosure, devices, methods, systems, and integrated circuits may enable greater efficiency in wireless power transfer with the use of an active rectifier in the wireless power receiver. The active rectifier may be implemented with actively controlled switches that may modify the impedance of the load, including by modifying properties such as a phase angle and a load voltage in the wireless power receiver to increase the efficiency and/or extracted power of the wireless power transfer, without requiring additional external circuit components.

One example is directed to a device configured for receiving a wireless power transfer. The device includes an active rectifier, rectifier input nodes, and a controller. The controller is operatively coupled to the active rectifier and configured to control the active rectifier to modify an impedance at the rectifier input nodes.

Another example is directed to a method for receiving a wireless power transfer. The method includes determining, by one or more processors, based on one or both of circuit parameters or circuit measurements, a modification of an impedance at input nodes of an active rectifier, comprising a modification of one or more of a phase angle, an output voltage, or a duty cycle, to result in one or both of a higher value of an efficiency of the wireless power transfer or a higher value of extracted power of the wireless power transfer. The method further includes applying, by the one or more processors, a control signal to the active rectifier, wherein the control signal is based on the determined modification of the impedance.

Another example is directed to an integrated circuit for controlling a wireless power transfer. The integrated circuit is configured to determine, based on one or both of circuit parameters or circuit measurements, a modification of an impedance at input nodes of an active rectifier, comprising a modification of one or more of a phase angle, an output voltage, or a duty cycle, to result in one or both of a higher value of an efficiency of the wireless power transfer or a higher value of extracted power of the wireless power transfer. The integrated circuit is further configured to apply a control signal to the active rectifier, wherein the control signal is based on the determined modification of the impedance.

The details of one or more examples of the invention are set forth in the accompanying drawings and the description below. Other features, objects, and advantages of the invention will be apparent from the description and drawings, and from the claims.

DETAILED DESCRIPTION

Figure 1:
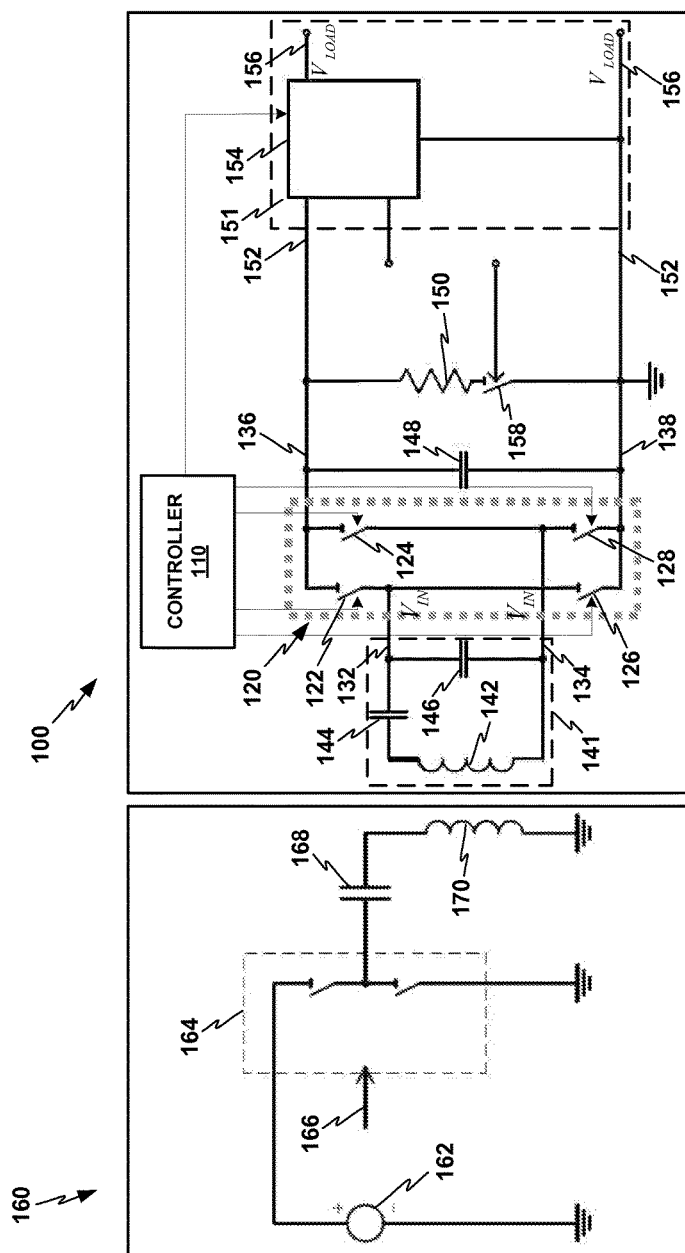
FIG. 1 is a circuit block diagram illustrating a mobile device configured for efficiently receiving a wireless power transfer from a wireless power transmitter, in accordance with an example of this disclosure.

FIG. 1 is a circuit block diagram illustrating a mobile device 100 configured for efficiently receiving a wireless power transfer from a wireless power transmitter 160, in accordance with an example of this disclosure. Mobile device 100 includes a controller 110, an active rectifier 120, and a voltage regulator 154, with controller 110 operatively coupled to active rectifier 120 and voltage regulator 154, in this example. Active rectifier 120 includes switches 122, 124, 126, and 128 disposed between rectifier input nodes 132 and 134, and rectifier output nodes 136 and 138. Rectifier input nodes 132 and 134 connect active rectifier 120 to a receiver coil 142 and capacitors 144, 146, which may collectively be referred to as a receiver circuit 141. Rectifier output nodes 136 and 138 connect active rectifier 120 to downstream circuit elements including a capacitor 148, a resistor 150, a communication switch 158, load line 152, a voltage regulator 154, and DC output lines 156.

Resistor 150 and communication switch 158 may be used for communication between reception and transmission. Capacitor 148 represents the output capacitance of active rectifier 120, and may not necessarily include a separate physical capacitor. Load lines 152, voltage regulator 154, and DC output lines 156 may be collectively referred to as a load circuit 151. Switches 122, 124, 126, and 128 are thus disposed between rectifier input nodes 132, 134 connected to receiver coil 142, and rectifier output nodes 136, 138 are thus connected to the downstream load circuit 151 including voltage regulator 154. While FIG. 1 depicts active rectifier 120 including switches 122, 124, 126, and 128, other examples may include either a full-bridge or half-bridge rectifier, and may include two or four diodes, metal-oxide semiconductor field effect transistors (MOSFETs), other any other analogous elements in place of illustrative switches 122, 124, 126, and 128. Any of these analogous alternatives may be considered within the intent of "switches 122, 124, 126, and 128" for purposes of this description. Mobile device 100 may be any type of device configured for receiving power through a wireless power transfer.

Mobile device 100 may in various examples include circuit elements downstream of active rectifier 120 for, e.g., filtering the rectified current from active rectifier 120, correcting the power factor of the rectified current, smoothing the pulsed direct current of the rectified current into a smooth direct current, and/or converting the voltage, before delivering the rectified current to a load. The load may be connected to DC output line 156 and may include, e.g., a battery charger configured for charging a battery of the mobile device 100. Voltage regulator 154 may be incorporated as part of the battery charger or other load. For purposes of this disclosure, a "rectified current" generated by active rectifier 120 need not be limited to a current that exhibits only passive rectification from alternating current, but may include any of a range of modified properties including those described above.

Wireless power transmitter 160 includes an input voltage source 162, a half-bridge inverter 164, an inverter control line 166, a capacitor 168, and a transmitter coil 170. Wireless power transmitter 160 is thereby configured to generate an inductive wireless power transfer from transmitter coil 170. As shown in FIG. 1, mobile device 100 is positioned for receiver coil 142 to be inductively coupled to transmitter coil 170 of wireless power transmitter 160, such that wireless power in the form of an inductive alternating current is transmitted from transmitter coil 170 to receiver coil 142. Receiver coil 142 may be configured for receiving the wireless power transfer, wherein the active rectifier 120 receives the alternating current from wireless power transmitter 160 and transmitter coil 170 via receiver coil 142.

Active rectifier 120 receives an alternating current via receiver coil 142. Switches 122, 124, 126, and 128 are configured to rectify an alternating current received via receiver coil 142, thereby generating a rectified current, and to transmit the rectified current to downstream load circuit 151 including voltage regulator 154. Voltage regulator 154 may be a DC/DC converter, a linear regulator, a low-dropout (LDO) regulator, or any other kind of regulator, in different examples. Control signal lines are connected from controller 110 to each of switches 122, 124, 126, and 128. Switches 122, 124, 126, and 128 are configured to operate under the control of controller 110. Controller 110 may also receive inputs (not depicted) indicating parameters or measurements of values of one or more circuit elements of mobile device 100. Controller 110 may, in some examples, be configured to use those indicated or sensed circuit element parameters or values in determining what control signals to transmit to switches 122, 124, 126, and 128 of active rectifier 120. Controller 110 may be implemented as a digital controller or as an analog controller in various examples. Controller 110 may be implemented as an integrated circuit, a collection of integrated circuits, a programmable logic device (PLD), a field-programmable gate array (FPGA), a general-purpose processor programmed with software, or other implementations, in various examples.

Controller 110 may control active rectifier 120 not only to provide standard rectification of an alternating current, but also to apply any of a selected range of controlled properties to the voltage and current received via receiver coil 142 and transmitted to load line 152 and voltage regulator 154. Controller 110 may control active rectifier 120 and optionally voltage regulator 154 to modify an impedance at rectifier input nodes 132, 134 by active rectifier 120. This may include controller 110 controlling active rectifier 120 to modify properties such as a phase angle between the voltage and the current of the rectified current generated at rectifier input nodes 132, 134 by active rectifier 120, and/or a duty cycle of active rectifier 120, and may also include controller 110 controlling voltage regulator 154 to control a load voltage of the rectified current generated by active rectifier 120. For example, controller 110 may be configured to control the timing of switches 122, 124, 126, and 128 relative to an alternating current received by active rectifier 120 via receiver coil 142, such that the timing of switches 122, 124, 126, and 128 modifies one or more of the phase angle between the input current and the input voltage (hereafter, "phase angle"), or the duty cycle of switches 122, 124, 126, and 128. Controller 110 may also control voltage regulator 154 to modify a load voltage of the rectified current generated by active rectifier 120 in any of various different ways, as further described below. By modifying one or more properties such as the phase angle, duty cycle, or load voltage of the rectified current, controller 110 may control active rectifier 120 to increase the efficiency of the wireless power transfer and/or to increase the value of the extracted power of the wireless power transfer, as received by mobile device 100, without requiring additional circuit components in mobile device 100.

Controller 110 may determine an impedance that may improve an efficiency of the wireless power transfer, and may control the timing of the switches to emulate the determined impedance. Controller 110 may determine how to improve an efficiency of the wireless power transfer in accordance with different criteria than might be used to achieve other potential performance goals, such as increasing the power of the wireless power transfer (e.g., the value of the extracted power of the wireless power transfer). The determined impedance may include inductive and/or capacitive impedance. Modifying the impedance of circuits of mobile device 100 may be done by adding one or more additional capacitors and/or inductors (collectively, circuit components) to load circuit 151, for example, but this would add additional weight, bulk, and expense. By modifying the impedance of the circuits of mobile device 100 (e.g., the impedance of active rectifier 120 and load circuit 151 collectively) by modifying the timing of switches 122, 124, 126, and 128 (e.g., modifying the on/off timing of each switch), controller 110 may increase the efficiency of the wireless power transfer, as received by mobile device 100, without the additional weight, bulk, and expense of additional circuit components.

In some examples, switches 122, 124, 126, and 128 may be implemented as metal-oxide semiconductor field effect transistors (MOSFET). In some examples, switches 122, 124, 126, and 128 may also be implemented as other MOS-based switches, metal semiconductor (MES)-based switches, gallium nitride (GaN) based switches such as metal-insulator semiconductor field effect transistors (MISFET), bipolar junction transistors, or other types of switch devices. In some examples, switches 122, 124, 126, and 128 may also be implemented as diodes.

Figure 3:
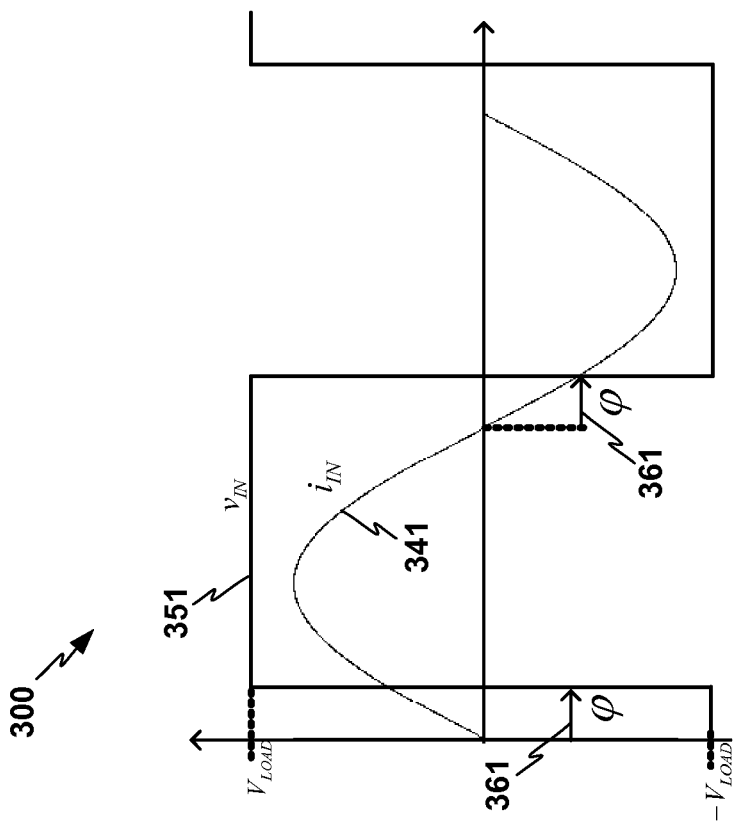
FIG. 3 is a graph of current and voltage over time in a power receiving circuit under control of a controller and an active rectifier as shown in FIG. 2, in accordance with an example of this disclosure.
Figure 2:
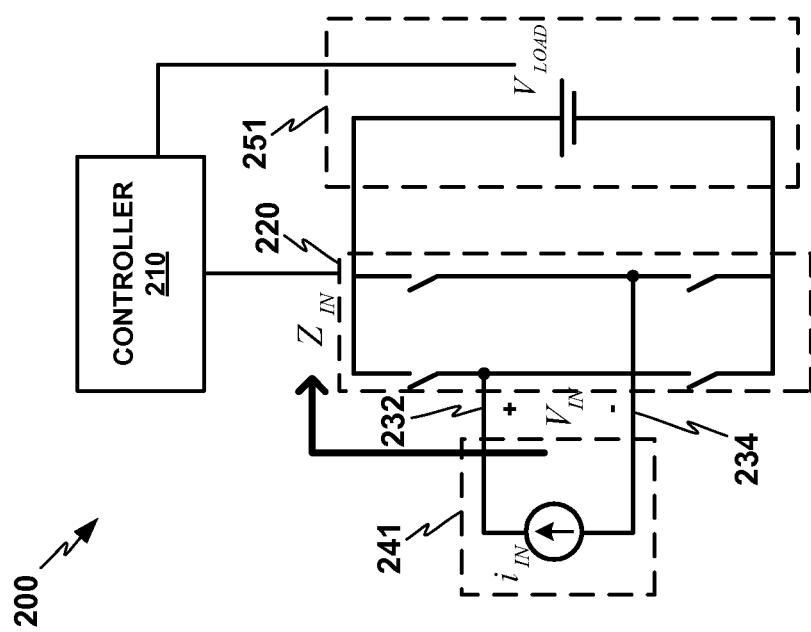
FIG. 2 is a simplified circuit block diagram illustrating a power receiving circuit configured for efficiently receiving a wireless power transfer, in accordance with an example of this disclosure.
Figure 5:
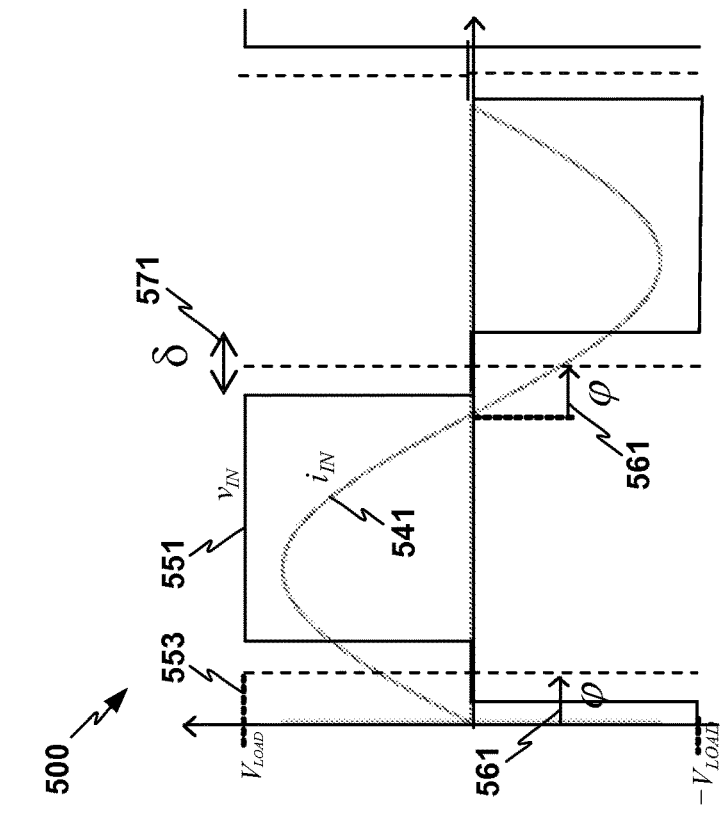
FIG. 5 is a graph of current, input voltage, and load voltage over time in a power receiving circuit under control of a controller and an active rectifier as shown in FIG. 4, in accordance with an example of this disclosure.
Figure 4:
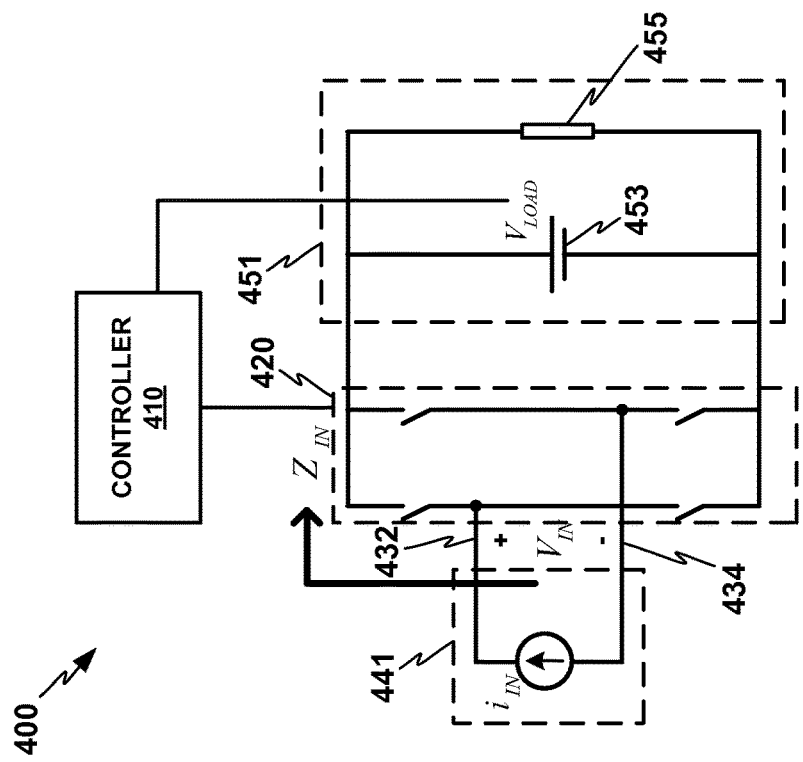
FIG. 4 is a simplified circuit block diagram illustrating a power receiving circuit configured for efficiently receiving a wireless power transfer, in accordance with another example of this disclosure.

Controller 110 may control active rectifier 120 to modify a load voltage of the rectified current generated by active rectifier 120 in any of various different ways, as noted above. Controller 110 may control active rectifier 120 to modify a load voltage first harmonic generated by active rectifier 120. Controller 110 may control active rectifier 120 to modify the load voltage first harmonic generated at rectifier input nodes 132, 134 by active rectifier 120 by modifying a load voltage amplitude generated by active rectifier 120, in some examples. An example of this is illustrated in FIGS. 2 and 3. Controller 110 may also control active rectifier 120 to modify both the phase angle and the load voltage first harmonic, and thereby the impedance, generated at rectifier input nodes 132, 134 by active rectifier 120 by modifying a duty cycle of switches 122, 124, 126, and 128, in some examples. An example of this is illustrated in FIGS. 4 and 5. In various examples, controller 110 controls rectifier 120 to modify the impedance at the rectifier input nodes 132, 134. Modifying the impedance at the rectifier input nodes may include applying a phase shift in the phase angle between the voltage and the current, thereby controlling the reactive portion of the impedance. Modifying the impedance at the rectifier input nodes may also include controlling the amplitude portion of the full impedance, e.g., by adjusting the full impedance with a DC/DC converter (load voltage $V_{LOAD}$), and/or by controlling the duty cycle of active rectifier 120, e.g., by applying a delay between the control signals for the switches in rectifier 120 (e.g., delaying the control signals to switches 122 and 128). Modifying the impedance at the rectifier input nodes may also include applying resonance matching or passive impedance matching, such as with a passive impedance matching network connected to rectifier input nodes 132, 134.

FIG. 2 is a simplified circuit block diagram illustrating a power receiving circuit 200 configured for efficiently receiving a wireless power transfer, in accordance with an example of this disclosure. Power receiving circuit 200 includes controller 210, receiver circuit 241, active rectifier 220, and load circuit 251. Power receiving circuit 200 may be a simplified form of one example of controller 110, receiver circuit 141, active rectifier 120, and load circuit 151 of mobile device 100 of FIG. 1. In the simplified representation of FIG. 2, receiver circuit 241 is modeled as having an input current $I_{IN}$ and an input voltage $V_{IN}$; active rectifier 220 has an input impedance $Z_{IN}$; and load circuit 251 is modeled as a simple voltage source at a load voltage $V_{LOAD}$, which is equal to the rectified voltage of the rectified current generated by active rectifier 220. It may be understood that load circuit 251 may include a DC/DC converter that is not depicted in FIG. 2, and is replaced by the simple voltage source with a load voltage $V_{LOAD}$ in the depiction of FIG. 2. Controller 210 is operably connected to active rectifier 220 and load circuit 251. Controller 210 may modify the phase angle and/or duty cycle of active rectifier 220, and/or may modify the load voltage $V_{LOAD}$ of load circuit 251, thereby modifying the impedance at the input nodes 232, 234 of active rectifier 220.

In some examples, the model of power receiving circuit 200 may be advantageous for a load circuit 251 that does not have a significant resistive component of its impedance, such that controller 210 may neglect the resistive component of the impedance and simply model the impedance of load circuit 251 in determining how to control active rectifier 220. In some examples, the model of power receiving circuit 200 may be advantageous for a load circuit 251 that has significant flexibility in its load voltage, such that controller 210 has significant freedom to modify the load voltage first harmonic by modifying the load voltage amplitude generated by active rectifier 220. The simplified model of power receiving circuit 200 as shown in FIG. 2 may be advantageous in modeling how controller 210 evaluates and determines how to control active rectifier 220, as further described below.

In the example of FIG. 2, active rectifier 220 has four switches that control the timing of the connections between two inputs lines from receiver circuit 241 and two output lines to load circuit 251. Controller 210 is connected to active rectifier 220 and configured to control the timing of the four switches of active rectifier 220. Controller 210 may apply specific control signals to the switches of active rectifier 220 to modify the impedance at the input nodes of active rectifier 220 to increase at least one of the efficiency of the wireless power transfer and/or or the extracted power of the wireless power transfer. For example, controller 210 may control active rectifier 220 to implement a phase shift, or a shift in the phase angle (or equivalently, "phase angle shift"), between the current and the load voltage as generated by active rectifier 220. In another example, the input may be a voltage source and the load may be a current source, and controller 210 may control active rectifier 220 to modify the impedance at the input nodes of active rectifier 220 to increase at least one of the efficiency of the wireless power transfer and/or or the extracted power of the wireless power transfer.

FIG. 3 is a graph 300 of current 341 and voltage 351 over time in power receiving circuit 200 under control of controller 210 and active rectifier 220 as shown in FIG. 2, in accordance with an example of this disclosure. Graph 300 shows input current $I_{IN}$ (at 341), input voltage $V_{IN}$, and load voltage $V_{LOAD}$ (overlapping at 351 in this example, though at different amplitudes in some examples) as described above with reference to FIG. 2, over time for a duration of one cycle of alternating current (e.g., 1/60 of a second). Graph 300 also shows a phase shift φ (at 361) by which controller 210 and active rectifier 220 may modify the phase angle away from zero between the current 341 and the load voltage 351 in power receiving circuit 200, e.g., as generated by active rectifier 220 under the control of controller 210.

Controller 210 may implement the phase shift φ (at 361) by modifying the timing of the switches in active rectifier 220. This modifying of the timing of the switches in active rectifier 220 may be considered in contrast to a passive rectifier that has four simple, passive diodes instead of actively controlled switches at the positions of the switches in active rectifier 220. In the passive rectifier, each particular diode admits current in the forward direction of the diode when the voltage applied at the diode is non-zero and in the forward polarity of the diode, such that the current remains in phase with the voltage, or at zero phase angle with the voltage. In contrast, each actively controlled switch in active rectifier 220 may be activated to be on out of phase with the voltage at that switch, such that the current admitted through the switch is out of phase with the voltage applied at the switch. Controller 210 may coordinate the timing of all four switches in active rectifier 220 to generate a current 341 with the same frequency as the input current but at a phase angle φ (361) with the load voltage 351.

In this example, controller 210 may detect circuit parameters or values of circuit measurements such as the input voltage $V_{IN}$ and the input current $I_{IN}$ (at 341), and/or as expressed as the input voltage first harmonic $V_{IN}^{(1)}$ and the input current first harmonic $I_{IN}^{(1)}$. and may evaluate or determine an input impedance first harmonic $Z_{IN}^{(1)}$ based on those circuit parameters or circuit measurements. (Measurements of circuit values may also be considered within "circuit parameters" for purposes of the discussion herein.) Controller 210 may then determine a load voltage amplitude $V_{LOAD}$ and a phase shift φ of active rectifier 220 to achieve a first harmonic load impedance that matches the input impedance first harmonic $Z_{IN}^{(1)}$, in accordance with the equation:

$$Z_{IN}^{(1)} = \frac{V_{IN}^{(1)}}{I_{IN}^{(1)}} = \frac{\frac{4}{\pi} \frac{V_{Load}}{I_{IN}^{(1)}} * e^{-j\varphi}}{} = \frac{4}{\pi} \frac{V_{Load}}{I_{IN}^{(1)}} * \cos(\varphi) - i\frac{4}{\pi} \frac{V_{Load}}{I_{IN}^{(1)}} * \sin(\varphi) = R_L + j(-X_L)$$

where the controller may match the load voltage first harmonic to the input voltage first harmonic, determined as:

$$V_{IN}^{(1)} = \frac{4}{\pi} V_{LOAD} * e^{-j\varphi}$$

Controller 210 may determine a load voltage amplitude $V_{LOAD}$ and/or a phase shift φ of active rectifier 220 to achieve a load impedance first harmonic that matches the input impedance first harmonic $Z_{IN}^{(1)}$, or that has a reduced difference, such that the efficiency of the wireless power transfer is increased, in this example. More generally, as shown in the later terms of the above equation for input impedance first harmonic $Z_{IN}^{(1)}$, controller 210 may control either or both of the load voltage $V_{LOAD}$ or the phase shift φ to synthesize either or both of the load resistance $R_L$ or the load reactance $X_L$. Additional discussion of how a controller of this disclosure can determine how to control an active rectifier of this disclosure to increase the efficiency of a wireless power transfer are further presented below.

FIG. 4 is a simplified circuit block diagram illustrating a power receiving circuit 400 configured for efficiently receiving a wireless power transfer, in accordance with another example of this disclosure. Power receiving circuit 400 may be analogous in many ways to power receiving circuit 200 of FIG. 2, and includes controller 410, receiver circuit 441, active rectifier 420, and load circuit 451. Power receiving circuit 400 may be a simplified form of one example of controller 110, receiver circuit 141, active rectifier 120, and load circuit 151 of mobile device 100 of FIG. 1. In the simplified representation of FIG. 4, receiver circuit 441 is modeled as having an input current $I_{IN}$ and an input voltage $V_{IN}$; active rectifier 420 has an input impedance $Z_{IN}$; and load circuit 451 is modeled as a simple voltage source 453 plus a load 455 in parallel, such that voltage source 453 is at a load voltage $V_{LOAD}$, which is equal to the rectified voltage of the rectified current generated by active rectifier 420. Voltage source 453 may be the fixed voltage of a battery, in some examples. It may be understood that load circuit 451 may include a DC/DC converter or other voltage regulator (analogous to voltage regulator 154 of FIG. 1) that is not depicted in FIG. 4, and is replaced by voltage source 453 plus load 455 in the depiction of FIG. 4. Controller 410 is operably connected to active rectifier 420 and load circuit 451. Controller 410 may modify the phase angle and/or duty cycle of active rectifier 420, and/or may modify the load voltage $V_{LOAD}$ of load circuit 451, thereby modifying the impedance at the input nodes 432, 434 of active rectifier 420.

In some examples, the model of power receiving circuit 400 may be advantageous for a load circuit 451 that has a significant resistive component of its impedance that may be modeled together with the reactance component of its impedance. In some examples, the model of power receiving circuit 400 may be advantageous for a load circuit 451 that does not have significant flexibility in its load voltage, such that controller 410 may modify the load voltage first harmonic by modifying the duty cycle of the switches of active rectifier 420, without modifying the load voltage amplitude generated by active rectifier 420.

For example, a DC/DC buck converter included in load circuit 451 may have a certain minimum input voltage required to function. In some examples, a buck converter in load circuit 451 may require a voltage greater than a downstream voltage, such as the voltage of a battery to be charged by the buck converter, which may be, e.g., 4.2 volts in one example, such that the buck converter of load circuit 451 requires a certain minimum voltage greater than 4.2 volts, e.g., 5.0 volts in one example. This type of constraint may be detected or read by controller 410, in some examples, and may or may not limit the freedom of controller 410 to modify the load voltage amplitude from the input voltage, in various examples. In some examples, controller 410 may detect the minimum voltage required by load circuit 451, and determine whether to modify the load voltage amplitude or the duty cycle of active rectifier 420 or both. In various cases, controller 410 may control active rectifier 420 and/or a DC/DC converter or other voltage regulator in load circuit 451 to modify both the phase angle and/or the load voltage first harmonic. In some examples, this may include controller 410 may control active rectifier 420 and/or a DC/DC converter or other voltage regulator in load circuit 451 to charge a battery included in voltage source 453.

The simplified model of power receiving circuit 400 as shown in FIG. 4 may be advantageous in modeling how controller 410 evaluates and determines how to control active rectifier 420, as further described below. Active rectifier 420 has four switches that control the timing of the connections between two inputs lines from receiver circuit 441 and two output lines to load circuit 451. Controller 410 is connected to active rectifier 420 and configured to control the timing of the four switches of active rectifier 420. Controller 410 may apply specific control signals to the switches of active rectifier 420 to implement a phase shift between the current and the load voltage as generated by active rectifier 420, as well as a duty cycle δ resulting in a voltage timing offset, as described below.

FIG. 5 is a graph 500 of current 541, input voltage 551, and load voltage 553 over time in power receiving circuit 400 under control of controller 410 and active rectifier 420 as shown in FIG. 4, in accordance with an example of this disclosure. Graph 500 shows input current $I_{IN}$ (at 541), input voltage $V_{IN}$ (at 551), and load voltage $V_{LOAD}$ (at 553) as described above with reference to FIG. 4, over time for a duration of one cycle of alternating current (e.g., 1/60 of a second). Graph 500 also shows a phase shift φ (at 561) by which controller 410 and active rectifier 420 may modify the phase angle away from zero between the current 541 and the voltage 551 in power receiving circuit 400, e.g., as generated by active rectifier 420 under the control of controller 410. Graph 500 further shows a duty cycle δ (at 571) by which controller 410 causes active rectifier 420 to implement a voltage timing offset and displace the timing of the load voltage 553 from the input voltage 551, which may be in addition to causing the phase shift φ (at 361) between the current 541 and the load voltage 553.

Controller 410 may implement the phase shift φ (at 561) and the duty cycle δ (at 571) by modifying both the timing and the duty cycle of the switches in active rectifier 420. In this way, controller 410 and active rectifier 420 may modify the phase shift φ (at 561) and the load voltage first harmonic to increase the efficiency of the wireless power transfer, and to maintain the same load voltage as required by load circuit 451.

In this example, controller 210 may detect circuit parameters such as the input voltage first harmonic $V_{IN}^{(1)}$ and the input current first harmonic $I_{IN}^{(1)}$ (at 341), and may evaluate or determine an input impedance first harmonic $Z_{IN}^{(1)}$ based on those circuit parameters. Controller 210 may then determine a phase shift φ and a duty cycle δ of active rectifier 220 to achieve a load impedance first harmonic that matches the input impedance first harmonic $Z_{IN}^{(1)}$, in accordance with the equation:

$$Z_{IN}^{(1)} = \frac{V_{IN}^{(1)}}{I_{IN}^{(1)}} = \frac{4}{\pi} \frac{V_{Load}\cos(\delta)}{I_{IN}^{(1)}} * e^{-j\varphi}$$

where the controller matches the load voltage first harmonic to the input voltage first harmonic, determined as a function of:

$$V_{IN}^{(1)} = \frac{4}{\pi} V_{LOAD} \cos(\delta) e^{-j\varphi}$$

Controller 210 may determine a phase shift φ and a duty cycle δ of active rectifier 220 to achieve a load impedance first harmonic that matches the input impedance first harmonic $Z_{IN}^{(1)}$, or that has a reduced difference, such that the efficiency of the wireless power transfer is increased, and without significantly modifying the load voltage amplitude, in this example.

Therefore, in the example of FIGS. 2 and 3, controller 210 may be configured such that controller 210 controlling active rectifier 220 to modify the load voltage first harmonic includes controller 210 being configured to modify the load voltage amplitude generated by active rectifier 220; while in the example of FIGS. 4 and 5, controller 410 may be configured such that controller 410 controlling active rectifier 420 to modify the load voltage first harmonic includes controller 410 being configured to modify the duty cycle of the switches in active rectifier 420.

In the examples described above, controller 110, 210, or 410 may be configured to determine, based on circuit parameters, a phase angle shift by which to modify the phase angle, such that the phase angle shift results in a higher value of an efficiency of the wireless power transfer and/or higher power. Controller 110, 210, or 410 may be further configured to apply a control signal to active rectifier 120, 220, 420, respectively, wherein the control signal is based on the determined phase angle shift. In some examples, the circuit parameters may include the impedance of the source (e.g., the impedance of wireless power transmitter 160), and determining the phase angle shift may include matching an impedance of a load (e.g., the impedance of load circuits 151, 251, 451, respectively) to the impedance of the source.

In some examples, the circuit parameters may also include the resistance of the load (e.g., the resistance of load circuits 151 or 451, respectively). In these examples, matching the impedance of the load to the impedance of the source may include modifying a reactance of the load (e.g., by modifying the reactance of active rectifier 120, 420, respectively, thereby modifying the total reactance of active rectifier 120 together with load circuit 151, or the total reactance of active rectifier 420 together with load circuit 451, respectively) relative to the resistance of the load to lower a difference between the impedance of the load and the impedance of the source.

In some examples, controller 110, 210, or 410 may be configured to determine the impedance repeatedly based on one or more new values among the one or more values of phase angle shift, duty cycle, and/or output voltage, or any value that affects resistance or reactance. In some examples, controller 110, 210, or 410 may be configured to receive one or more of the circuit parameters via one or more signal inputs, and derive one or more of the circuit parameters based on the one or more signal inputs. Controller 110, 210, or 410 may be configured to control active rectifier 120, 220, 420, respectively, such that the modified phase angle between the input current and the input voltage of the alternating current results in an improved efficiency of the wireless power transfer for mobile device 100.

Figure 6:
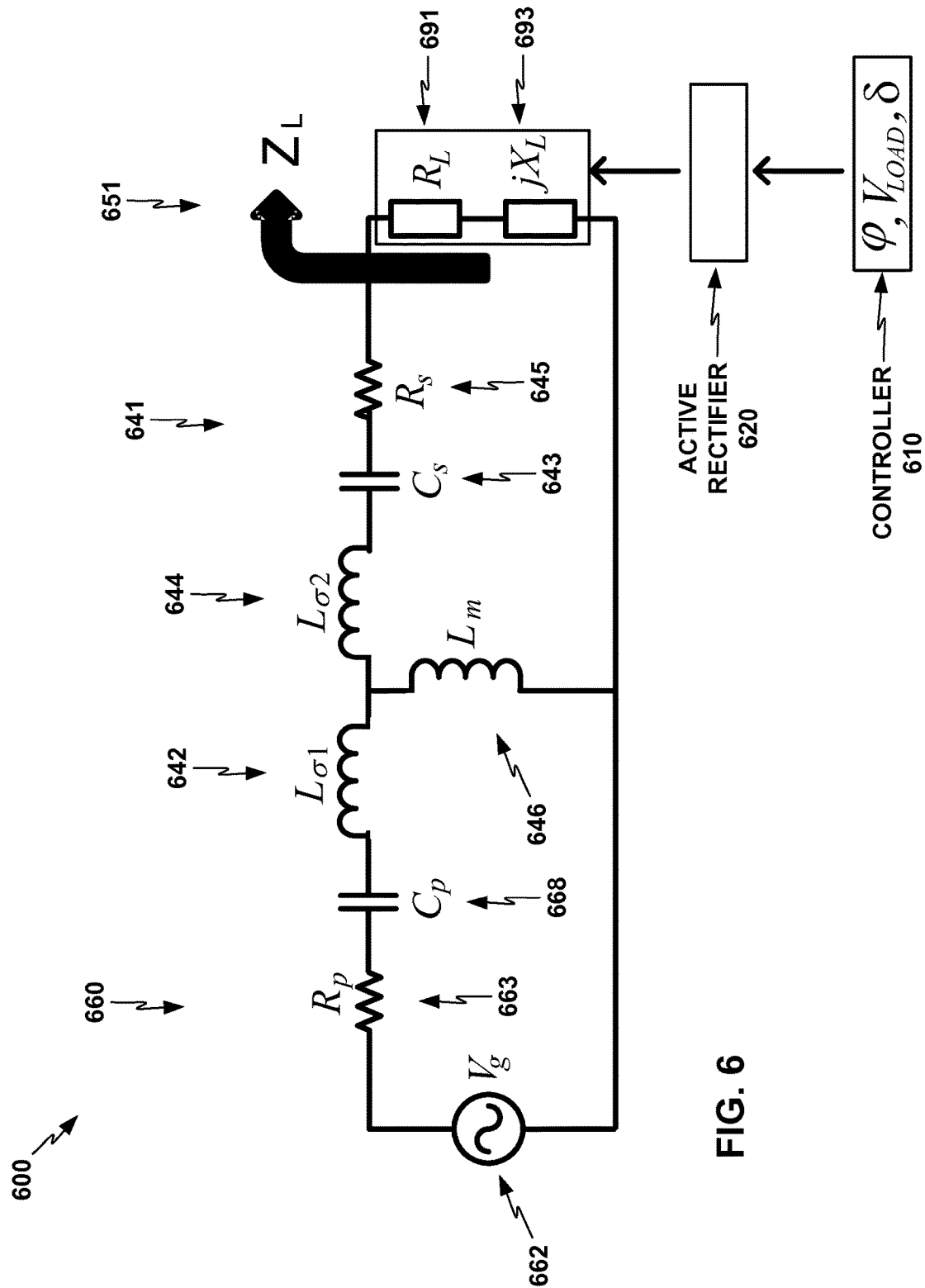
FIG. 6 is a simplified circuit block diagram illustrating a wireless power transfer circuit configured for efficiently receiving a wireless power transfer, in accordance with another example of this disclosure.

FIG. 6 is a simplified circuit block diagram illustrating a wireless power transfer circuit 600 configured for efficiently receiving a wireless power transfer, in accordance with another example of this disclosure. Wireless power transfer circuit 600 is analogous in some ways to the combined system of mobile device 100 and wireless power transmitter 160 as shown in FIG. 1, in which the combined system is modeled in an equivalent T-model representation in which the combination of transmitter coil 170 and receiver coil 142 are modeled as the combination of a first inductor 642 with inductance $L_{o1}$, a second inductor 644 with inductance $L_{o2}$, and a mutual inductor 646 with mutual inductive reactance $L_m$. This representation may enable treatment of the inductances either separately or together, and simplify certain modeling equations involved in determinations by a controller of this disclosure, and may simplify the implementation of the controller.

In the equivalent T-model representation of FIG. 6, the remainder of a wireless power transmitter 660 (besides the inductive coil) is modeled as a generator voltage source 662 with voltage $V_g$, a transmitter resistor 663 with resistance $R_p$, and a transmitter capacitor 668 with capacitance $C_p$; the remainder of a wireless receiver circuit 641 (besides the inductive coil) is modeled as a receiver capacitor 643 with capacitance $C_s$ and a receiver resistor 645 with resistance $R_s$; and a load circuit 651 is modeled as a resistive load impedance block 691 with load resistance $R_L$ and a reactance load impedance block 693 with reactance $jX_L$, the two of which together present a combined load impedance $Z_L$. In the equivalent T-model representation of FIG. 6, controller 610 and active rectifier 620 are simplified as functional blocks for applying control parameters such as phase shift φ and the DC voltage at the rectified output $V_{DC}$ to control the first harmonic of the input voltage, and to determine a load impedance of load 693. It may be understood that load circuit 651 may include a DC/DC converter or other voltage regulator, which is not depicted in FIG. 6, and the controller may also control the voltage regulator. In this representation, rectified voltage $V_{DC}$ may represent any of several forms of the rectified voltage, such as the rectified voltage first harmonic, or the rectified voltage amplitude, as discussed above.

In the example of FIG. 6, the circuit parameters evaluated by controller 610 may therefore include one or more values of resistance (e.g., resistance $R_p$ of transmitter resistor 663, resistance $R_s$ of receiver resistor 645, load resistance $R_L$ of resistive load impedance block 691) and one or more values of reactance (e.g., capacitance $C_p$ of transmitter capacitor 668, capacitance $C_s$ of receiver capacitor 643, inductance $L_{o1}$ of first inductor 642, inductance $L_{o1}$ of second inductor 644, mutual inductive reactance $L_m$ of mutual inductor 646). In the example of FIG. 6, controller 610 determining the phase angle shift ϕ to apply to increase the efficiency of the wireless power transfer may include determining a load impedance RL+jXL of load 693 to raise the value of the efficiency of the wireless power transfer. In various examples to which FIG. 6 may be applicable, controller 610 may evaluate or determine a value η of the efficiency of the wireless power transfer as a function of the one or more values of resistance (e.g., resistance $R_p$ of transmitter resistor 663, resistance $R_s$ of receiver resistor 645, load resistance $R_L$ of resistive load impedance block 691), the one or more values of reactance (e.g., capacitance $C_p$ of transmitter capacitor 668, capacitance $C_s$ of receiver capacitor 643, inductance $L_{o1}$ of first inductor 642, inductance $L_{o2}$ of second inductor 644, mutual inductive reactance $L_m$ of mutual inductor 646), and the load reactance $jX_L$.

Figure 7:
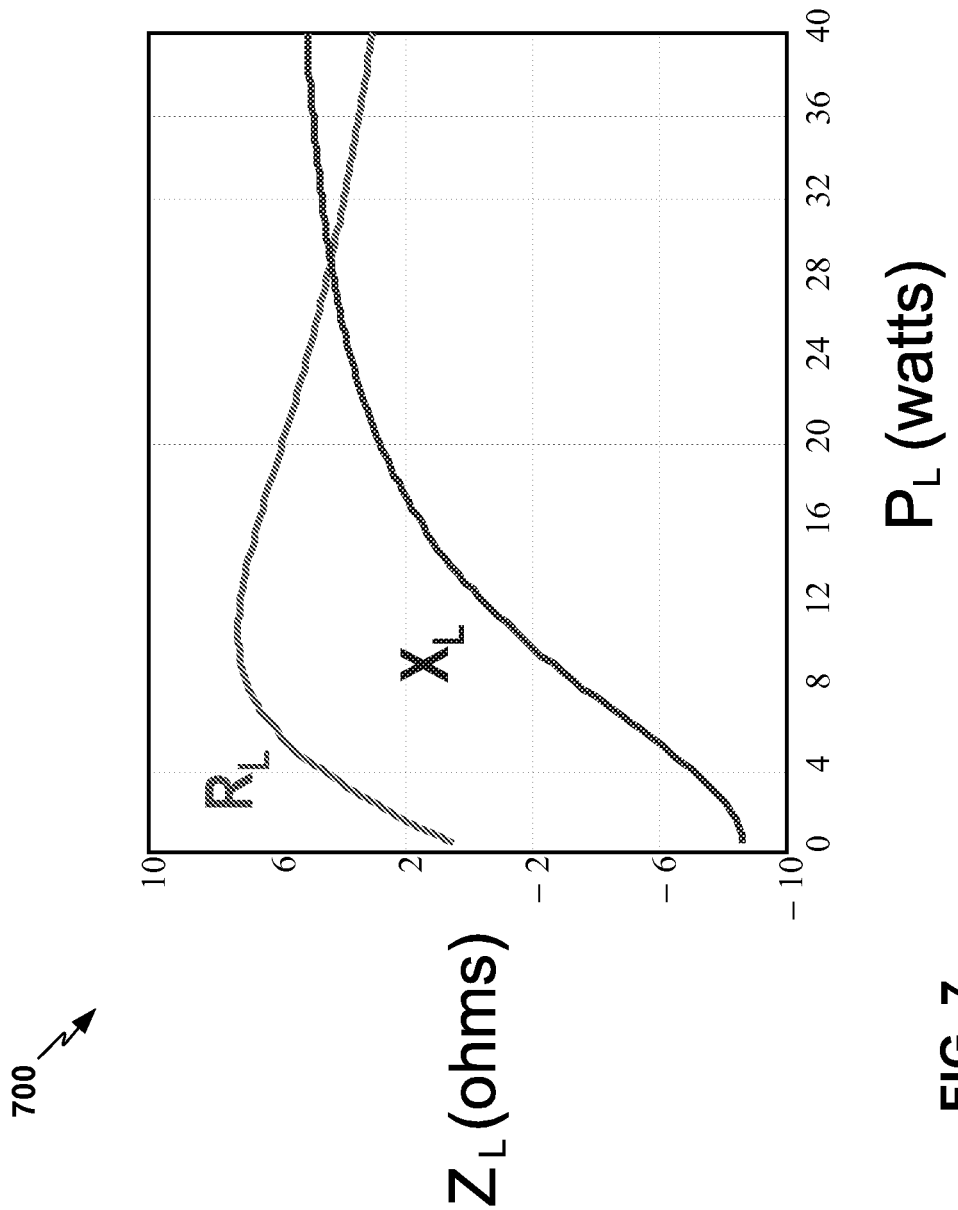
FIG. 7 depicts a graph showing simulations of changes in the efficiency of a wireless power transfer as a function of load impedance as modified by a controller and an active rectifier for various values of load resistance, in accordance with one set of examples of this disclosure.

FIG. 7 depicts a graph 700 showing simulations of changes in a wireless power transfer in terms of load resistance $R_L$ and load reactance $X_L$ as a function of load power $P_L$ as modified by a controller (e.g., controllers 110, 210, 410, 610) and an active rectifier (e.g., active rectifiers 120, 220, 420, 620), for various values of load resistance (e.g., load resistance $R_L$ of resistive load impedance block 691), in accordance with one set of examples of this disclosure. Graph 700 may represent evaluations or determinations that may be performed by a controller of this disclosure of the controller may increase the efficiency η of a wireless power transfer.

As shown in graph 700, the controller may determine that the efficiency at each value of load resistance and reactance varies as a function of load. In one example, the controller may determine that the efficiency of the wireless power transfer has a peak at approximately −3.39 ohms of load reactance, and that this peak may be at about the same value of load reactance at each value of load resistance. The controller may therefore control the active rectifier to apply or modify at least one value of phase angle shift ϕ and rectified voltage v to apply a load reactance $X_L$ of −3.39 ohms instead of zero ohms. By doing so, a controller of this disclosure may increase the efficiency of the wireless power transfer to about 88% in the case where the load resistance is 1 or 4 ohms, to about 90% in the case where the load resistance is 2 or 3 ohms, and to about 86% in the case where the load resistance is 5 ohms, for example.

In this example, the controller may determine that it may apply −3.39 ohms of load reactance by applying a phase angle and/or load voltage equivalent to a capacitive reactance in series with the load circuit equivalent to a load capacitor with capacitance of 380 nanofarads (nF):

$$C_L = -\frac{1}{\omega X_L} = 380 \text{ nF}.$$

such that, at 2 ohms of load resistance, the efficiency of the wireless power transfer is increased from about 79% (at zero ohms of load reactance, or as with a passive rectifier) to about 90%. In other examples, the controller may determine that applying a different value of load reactance, either negative or positive, may optimize or otherwise increase the efficiency of a wireless power transfer. In some examples, the controller may apply a capacitive reactance in series with the load circuit to achieve a reactance below zero, or an inductive reactance in series with the load circuit to achieve a reactance above zero.

Figure 8:
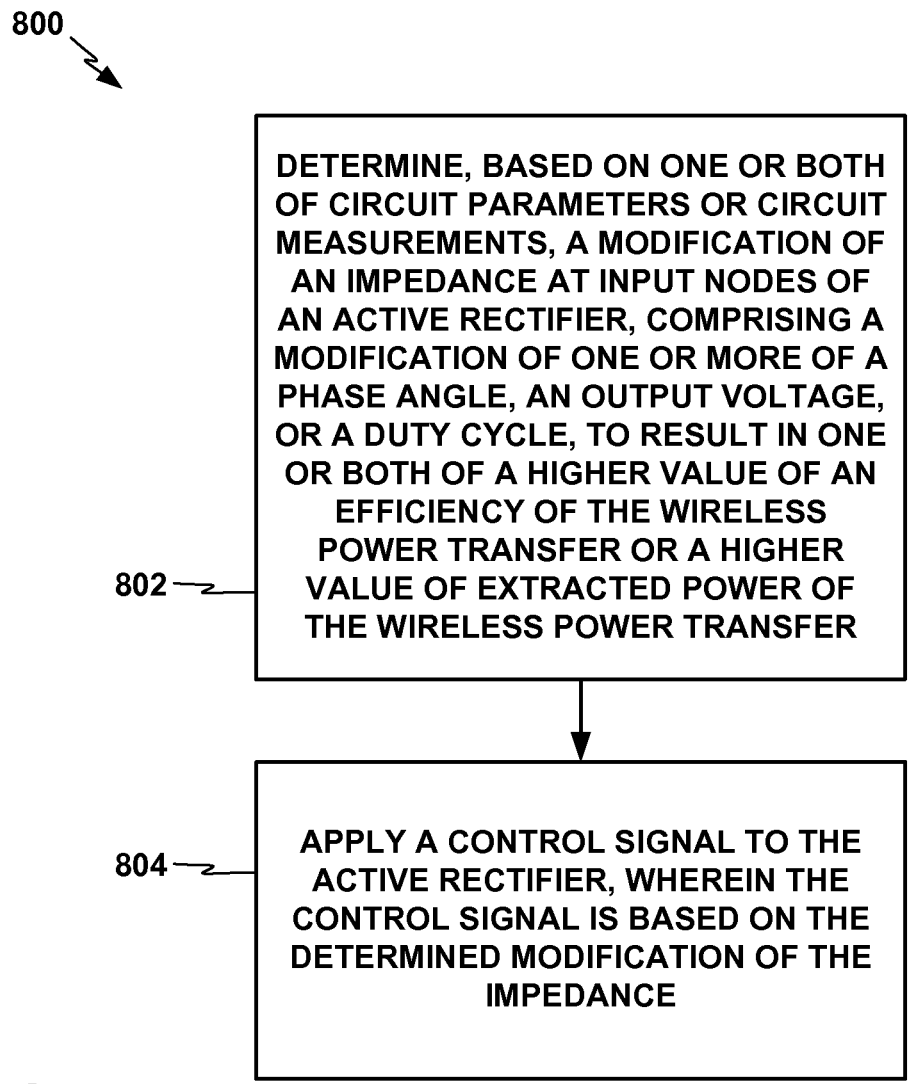
FIG. 8 is a flowchart illustrating a method of efficiently receiving a wireless power transfer, among other advantages, in accordance with an example of this disclosure.

FIG. 8 is a flowchart illustrating a method 800 of efficiently receiving a wireless power transfer, among other advantages, in accordance with an example of this disclosure. Method 800 may be a more generalized form of the operation of various controllers and/or active rectifiers of this disclosure, including as described above with reference to FIGS. 1-7. In the example of FIG. 8, method 800 includes determining, by one or more processors (e.g., by one or more of controllers 110, 210, 410, 610 or by one or more processors comprised in one or more of controllers 110, 210, 410, 610), based on one or both of circuit parameters or circuit measurements, a modification of an impedance at input nodes of an active rectifier, comprising a modification of one or more of a phase angle, an output voltage, or a duty cycle, to result in one or both of a higher value of an efficiency of the wireless power transfer or a higher value of extracted power of the wireless power transfer (802). Method 800 further includes applying, by the one or more processors (e.g., by one or more of controllers 110, 210, 410, 610 or by one or more processors comprised in one or more of controllers 110, 210, 410, 610), a control signal to an active rectifier (e.g., one or more of active rectifiers 120, 220, 420, 620), wherein the control signal is based on the determined modification of the impedance (804).

In some examples, a device, method, or integrated circuit of this disclosure may conform to a set of standards promulgated by a standards-setting body in the area of wireless power. Some examples of this disclosure may conform to the Qi standard or other standards set by the Wireless Power Consortium (WPC), which may be described and updated at the wirelesspowerconsortium.org website. Some examples of this disclosure may conform to the Rezence standard or other standards set by the Alliance for Wireless Power (A4WP), which may be described and updated at the rezence.com website. Some examples of this disclosure may conform to standards set by the Power Matters Alliance (PMA), which may be described and updated at the powermatters.org website. Some examples of this disclosure may conform to any of various versions of the standards indicated above, or to other sets of standards set by other associations besides those indicated above.

Any of the circuits, devices, and methods described above may be embodied in or performed in whole or in part by any of various types of integrated circuits, chip sets, and/or other devices, and/or as software executed by a computing device, for example. This may include processes performed by, executed by, or embodied in one or more microcontrollers, central processing units (CPUs), processing cores, field-programmable gate arrays (FPGAs), programmable logic devices (PLDs), virtual devices executed by one or more underlying computing devices, or any other configuration of hardware and/or software.

Various examples of the invention have been described. These and other examples are within the scope of the following claims.

What is claimed is:

1. A device for receiving a wireless power transfer, the device comprising:
   an active rectifier;
   rectifier input nodes;
   a load circuit connected to the active rectifier, the load circuit comprising a voltage regulator; and
   a controller operatively coupled to the active rectifier and the voltage regulator, the controller configured to control the active rectifier and the voltage regulator to modify an impedance at the rectifier input nodes by being configured to:
   determine, based on one or both of circuit parameters or circuit measurements, a modification of the impedance at the rectifier input nodes, comprising a modification of one or more of a phase angle to induce a phase angle shift, an output voltage, or a duty cycle to result in one or both of a higher value of an efficiency of the wireless power transfer or a higher value of extracted power of the wireless power transfer; and
   apply a control signal to the active rectifier,
   wherein the control signal is based on the determined modification of the impedance at the rectifier input nodes, and
   wherein the circuit parameters comprise a load resistance and a load reactance, and to determine the phase angle shift a load impedance is determined to raise the value of the efficiency of the wireless power transfer, wherein the value of the efficiency of the wireless power transfer is determined as a function of the load resistance and the load reactance.

2. The device of claim 1, wherein the active rectifier comprises a plurality of switches, and the controller is further configured to control a timing of the switches relative to an alternating current received by the active rectifier, such that the timing of the switches modifies the impedance at the rectifier input nodes.

3. The device of claim 2, wherein the controller is further configured to determine an impedance that would improve an efficiency of the wireless power transfer, and to control the timing of the switches to emulate the determined impedance, wherein the timing of the switches modifies the impedance at the rectifier input nodes by modifying at least one of:
   a phase angle between the input current and the input voltage of the alternating current, or
   a duty cycle of the switches.

4. The device of claim 2, wherein the plurality of switches comprises four switches disposed between two conducting lines connected to a receiver coil and two conducting lines connected to the load circuit, such that the four switches are configured to rectify an alternating current received via the receiver coil, thereby generating a rectified current, and to transmit the rectified current to the load circuit.

5. The device of claim 4, wherein the controller is further configured to modify the impedance at the rectifier input nodes by modifying a load voltage of the voltage regulator.

6. The device of claim 4, wherein the voltage regulator comprises a DC/DC converter.

7. The device of claim 4, wherein the voltage regulator comprises a low-dropout (LDO) regulator.

8. The device of claim 2, wherein at least one of the switches comprises at least one of a metal-oxide semiconductor field effect transistor (MOSFET) or a metal-insulator semiconductor field effect transistor (MISFET).

9. The device of claim 1, wherein the controller is further configured to control the active rectifier to modify a load voltage first harmonic generated by the active rectifier.

10. The device of claim 9, wherein the controller is further configured such that being configured to control the active rectifier to modify the load voltage first harmonic comprises being configured to modify a voltage amplitude generated by the active rectifier.

11. The device of claim 9, wherein the active rectifier comprises a plurality of switches, and wherein the controller is further configured such that being configured to control the active rectifier to modify the load voltage first harmonic comprises being configured to modify a duty cycle of the switches.

12. The device of claim 1, wherein the controller is further configured to determine the phase angle shift repeatedly based on one or more new values among one or more values of the load resistance or one or more values of the load reactance.

13. The device of claim 1, wherein the controller is further configured to receive one or more of the circuit parameters via one or more signal inputs, and to derive one or more of the circuit parameters based on the one or more signal inputs.

14. The device of claim 1, further comprising a receiver coil configured for receiving the wireless power transfer, wherein the active rectifier receives the alternating current via the receiver coil.

15. The device of claim 1, further comprising the active rectifier receiving the alternating current via a passive impedance matching network.

16. The device of claim 1, wherein the controller is configured to control the active rectifier to modify a phase angle between the input current and the input voltage of the alternating current to result in in one or both of an improved efficiency of the wireless power transfer or a higher value of extracted power of the wireless power transfer.

17. A method for receiving a wireless power transfer, the method comprising:
   determining, by one or more processors, based on one or both of circuit parameters or circuit measurements, a modification of an impedance at input nodes of an active rectifier that comprises a plurality of switches, comprising a modification of one or more of a phase angle to induce a phase angle shift, an output voltage, or a duty cycle, to result in one or both of a higher value of an efficiency of the wireless power transfer or a higher value of extracted power of the wireless power transfer; and
   applying, by the one or more processors, a control signal to at least one of the active rectifier or a voltage regulator connected to an output of the active rectifier, wherein the control signal is based on the determined modification of the impedance,
   wherein the applying comprises controlling a timing of the plurality of switches relative to an alternating current at the input nodes of the active rectifier, such that the timing of the switches modifies the phase angle between the input current and the input voltage of the alternating current,
   wherein the circuit parameters comprise one or more values of resistance and one or more values of reactance, and
   wherein determining the modification comprises determining the phase angle shift by determining a load impedance to raise the value of the efficiency of the wireless power transfer, wherein the load impedance is separate from the one or more values of reactance, and wherein the value of the efficiency of the wireless power transfer is determined as a function of the one or more values of resistance, the one or more values of reactance, and the load reactance.

18. An integrated circuit for controlling a wireless power transfer, the integrated circuit being configured to:
determine, based on one or both of circuit parameters or circuit measurements, a modification of an impedance at input nodes of an active rectifier that comprises a plurality of switches, comprising a modification of one or more of a phase angle to induce a phase angle shift, an output voltage, or a duty cycle, to result in one or both of a higher value of an efficiency of the wireless power transfer or a higher value of extracted power of the wireless power transfer; and
apply a control signal to at least one of the active rectifier or a voltage regulator connected to an output of the active rectifier, wherein the control signal is based on the determined modification of the impedance, to control a timing of the switches relative to an alternating current at the input nodes of the active rectifier, such that the timing of the switches modifies the phase angle between the input current and the input voltage of the alternating current, wherein the circuit parameters comprise one or more values of resistance and one or more values of reactance, and wherein to determine the modification comprises the integrated circuit being configured to determine the phase angle shift by determining a load impedance to raise the value of the efficiency of the wireless power transfer, wherein the load impedance is separate from the one or more values of reactance, and wherein the value of the efficiency of the wireless power transfer is determined as a function of the one or more values of resistance, the one or more values of reactance and the load reactance.

* * * * *